United States Patent [19]

Johnson et al.

[11] Patent Number: 4,891,977
[45] Date of Patent: Jan. 9, 1990

[54] MICROBRIDGE SENSOR BONDING PAD DESIGN FOR IMPROVED ADHESION

[75] Inventors: Robert G. Johnson; James O. Holmen, both of Minnetonka; Jeffrey A. Ridley, Burnsville, all of Minn.

[73] Assignee: Honeywell Inc., Minneapolis, Minn.

[21] Appl. No.: 285,272

[22] Filed: Dec. 16, 1988

[51] Int. Cl.$^4$ .................. G01F 1/68; H01C 17/28; H01C 1/102
[52] U.S. Cl. .................. 73/204.26; 29/621; 338/309
[58] Field of Search .............. 29/620, 621; 73/204.26; 338/309, 327, 328; 427/102, 103; 437/192, 918; 148/DIG. 136

[56] References Cited

U.S. PATENT DOCUMENTS

| 3,996,551 | 12/1976 | Croson | 427/103 |
| 4,129,848 | 12/1978 | Frank | 338/309 |
| 4,396,900 | 8/1983 | Hall | 29/620 |
| 4,501,144 | 2/1985 | Higashi et al. | |
| 4,683,159 | 7/1987 | Bohrer et al. | 428/138 |

Primary Examiner—Herbert Goldstein
Attorney, Agent, or Firm—Omund R. Dahle

[57] ABSTRACT

An improved connector pad stack structure for use in microstructure devices having a silicon nitride surface in which the sensor metal such as platinum or Ni-Fe is eliminated from the pad bonding site and only adhesion promoting metals are used on the $Si_3N_4$ to provide a stronger, more durable and reliable pad stack.

14 Claims, 4 Drawing Sheets

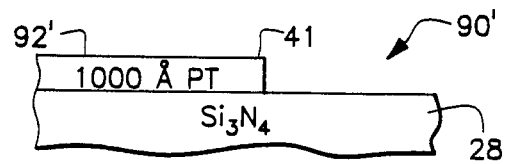
Fig. 3
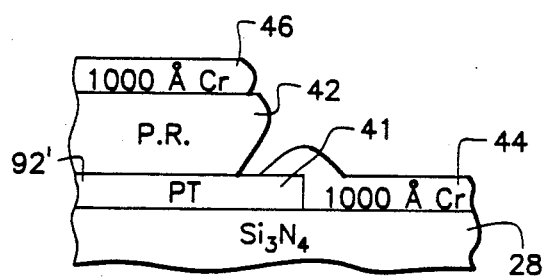
Fig. 4
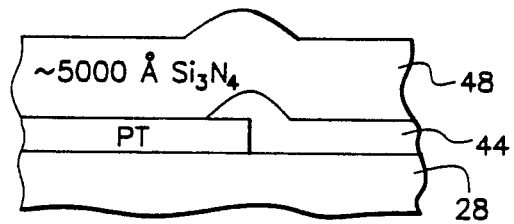
Fig. 5
Fig. 6
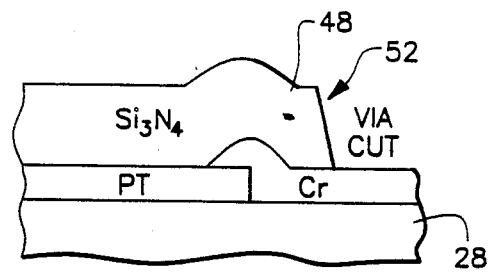
Fig. 7
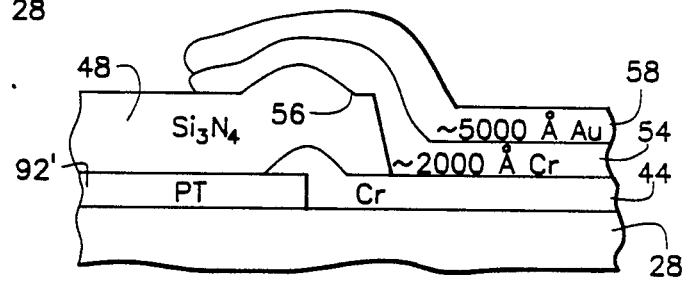
Fig. 8
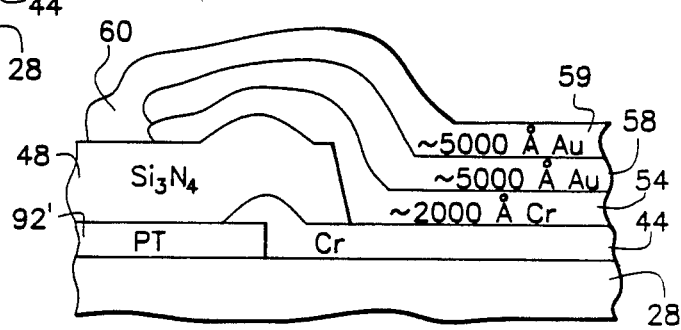
Fig. 9
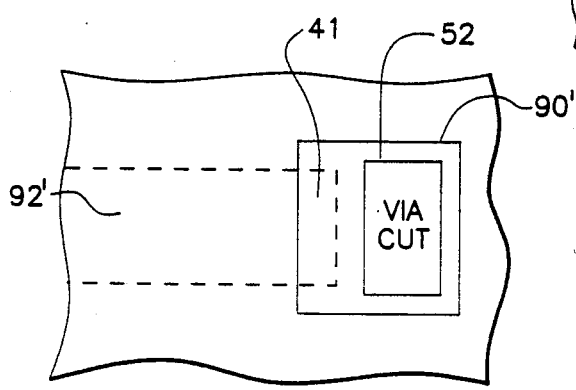

MICROBRIDGE SENSOR BONDING PAD DESIGN FOR IMPROVED ADHESION

BACKGROUND OF THE INVENTION

This invention is directed to the field of high adhesion metal film pad stack compositions for microbridge air flow sensors.

The metal pad stacks are designed so that wire bond techniques or other connection can be made to the microbridge sensor at these pad stacks. High mechanical stresses can occur at these pad stacks so that a high adhesion of all layers of the stack is required. In the prior art the pad adhesion in microbridge air flow sensors is marginal due to the incorporation of platinum or nickel-iron (i.e., permalloy) sensor material as a part of the pad stack composite. In other words the pad areas in permalloy or platinum air flow sensors are potential sites for failure by reason of delamination. A typical prior art pad structure of a microbridge air flow sensor is shown in U.S. Pat. No. 4,683,159. U.S. Pat. No. 4,501,144 is another example. Both of these patents are also assigned to the assignee of the present invention. FIG. 1 of the U.S. Pat. No. 4,683,159 is reproduced herein as FIG. 1 and the teachings of the patent are incorporated by reference. Briefly in FIG. 1 there is shown an integrated semiconductor device comprising a semiconductor body 20, such as monocrystalline silicon, with a first surface 36 having a predetermined orientation with respect to a crystalline structure in the semiconductor body. The semiconductor body has a depression 30 formed into the first surface of the body. A layer(s) 28,29 of thin film dielectric material, such as silicon nitride ($Si_3N_4$), covers at least a portion of the first surface. A thin film member 32,34 comprising the layer of dielectric material has a predetermined configuration bridging the depression. The member is connected to the first surface at substantially opposing ends of the predetermined configuration. The depression opens to the first surface along an edge 110,110a,110b,110c on each side of the member.

The thin film silicon nitride bridge members 32 and 34 include a pair of deposited thin film heat sensors 22 and 24, and a thin film heater 25. These deposited thin film resistive elements 22, 24, and 26 are preferably of platinum or Ni-Fe (permalloy) and the elements 22, 24, and 26 are generally encapsulated in the thin film of the silicon nitride comprising layers 28 and 29. Leads 92 connect the elements 22, 24, and 26 to pad areas 90 for electrically connecting the elements with other circuitry.

In the fabrication of the microbridge sensor devices, it was found necessary to design a new pad metal stack configuration to improve the pad adhesion.

BRIEF DESCRIPTION OF THE DRAWINGS

FIGS. 3-10 show a sequence of fabrication of an improved pad metal stack according to the invention.

DETAILED DESCRIPTION OF THE PREFERRED EMBODIMENT

Figure 1:
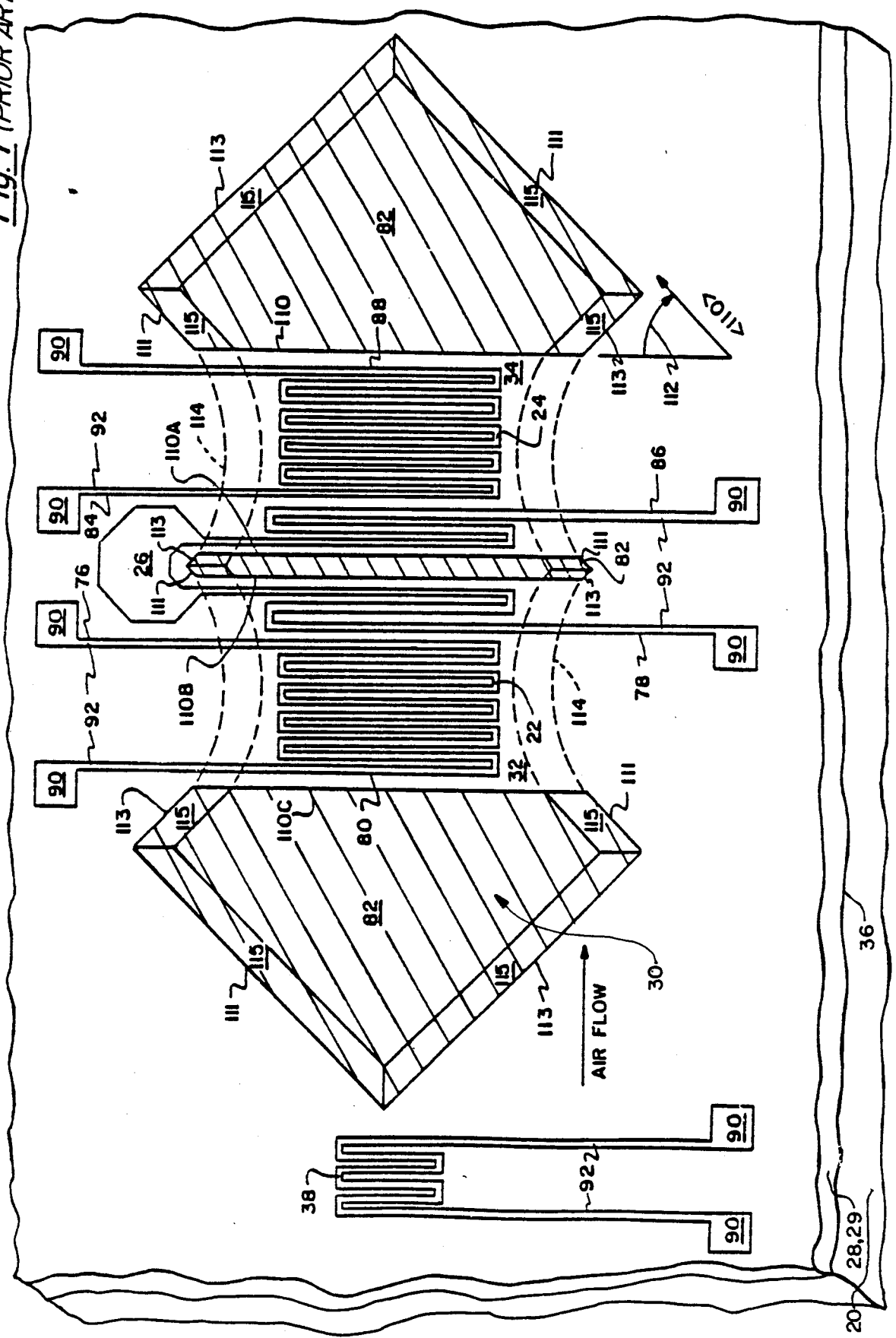
FIG. 1 is a prior art illustration of a microbridge thin film flow sensor.
Figure 2:
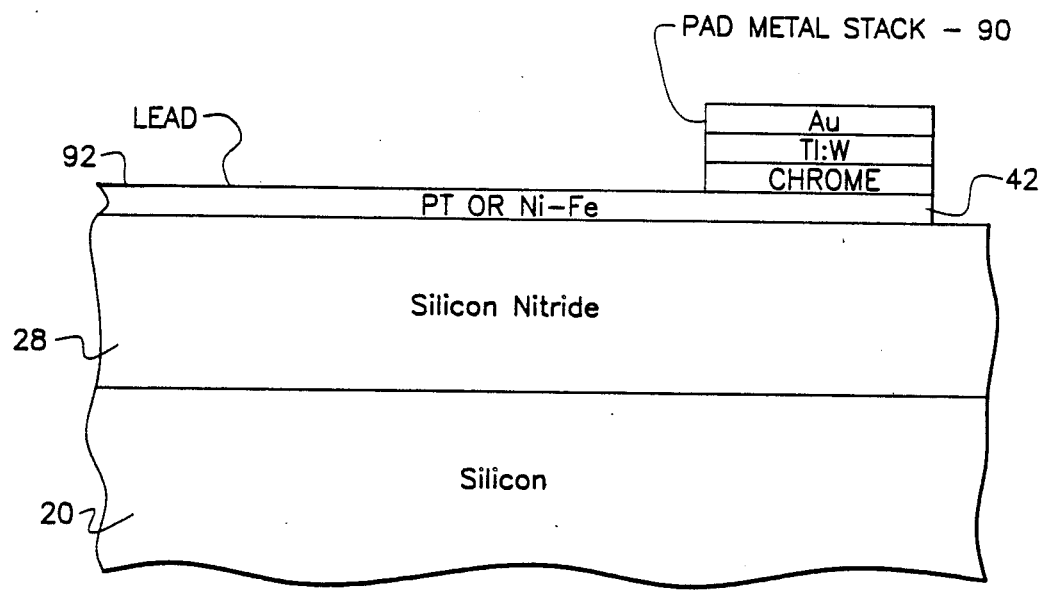
FIG. 2 is a prior art illustration of a conventional pad metal stack.

Referring briefly to the prior art FIG. 1, it can be seen that the leads 92 extend from the resistive elements 22, 24, and 26 and into the connecting pads 90. A cross-section of these leads and pad structure in the prior art is like that shown in FIG. 2 where the silicon nitride thin film 28, which is on the surface of the silicon 20, has deposited on the surface the Ni-Fe or Pt thin film lead 92. At the end portion 42 of the Pt or Ni-Fe lead 92 is defined the site for the pad.

It has been found that the pad adhesion in microbridge air flow sensors is marginal due to the incorporation of the platinum or the Ni-Fe sensor material as part of the pad stack composite. A new design which eliminates these less adherent metals from the pad stack bonding area improves pad reliability and durability. The sequence shown in the FIGS. 3 to 8 discloses an improved pad structure for the sensor when platinum is selected as the sensor metal.

Referring now to FIG. 3, there is shown in an elevation view a portion of the thin film 28 of silicon nitride near the bonding pad area 90'. The end portion 41 of the lead 92, which is deposited on the silicon nitride extends to the bonding pad area. This lead 92' is the termination of a sensor like or similar to those (i.e., 22, 24) shown in FIG. 1. The platinum thin film layer of FIG. 3 has been deposited on the silicon nitride and delineated to form the sensor and lead, and a high temperature stabilization anneal of the platinum has been made to develop the properties necessary for effective device performance such as sensitivity, stability, and reliability. It may also be desirable to include a thin film adhesion layer beneath the platinum.

FIG. 4 shows an intermediate step at the beginning of preparation for a bonding site within the bonding pad area, which bonding site is to be positionally isolated or offset from the platinum. A layer of photoresist 42 is deposited and delineated (exposing $Si_3N_4$ at the bonding pad area to allow a thin Cr deposition at the bonding pad area) followed by the sputter deposition of ~1000 angstroms of chromium 44,46. It will be noted that the Cr layer extends to and slightly overlays the end of the platinum at 41. The photoresist 42 and its overlaying chromium layer 46 is removed. A passivating layer of silicon nitride 48 on the order of 4000–5000 angstroms is deposited as shown in FIG. 5.

Referring now to FIG. 6, there is shown a top view of the structure of FIG. 5 including the lead 92' terminating at 41 and the overlaying passivating layer of $Si_3N_4$. Also identified at 90' is the bonding pad area and a via cut 52 through the passivating layer to the underlying Cr layer 44 which via cut is offset and positionally isolated from the platinum 41. This isolated bonding site 53 formed at the cut 52 is also shown in the elevation view of FIG. 7.

To complete the bonding site 53 there is shown in FIG. 8 that about 200 angstroms of chromium 54 are deposited into the via cut 52 on top of the chromium layer 44, the layer 54 extending over the upper edge 56 of the $Si_3N_4$ 48. Over the Cr layer 54 is a layer of gold 58 to which wire bonds can be made. The thickness of the gold layer is not critical but may be on the order of 4000–5000 angstroms. In a modification of the pad stack structure of FIG. 8, the gold layer 58 can be covered with a thin film of Cr. Further, it may be desirable in certain devices to deposit a thin film diffusion barrier of Ti:W (titanium tungsten alloy) between the chromium layer(s) and the gold layer. One variation of the structure of FIG. 8 is shown in FIG. 9 and can be used if corrosion of the Cr exposed at the very edges of the pad is a problem. In FIG. 9, the gold deposition/delineation procedure is modified so that the gold layer 59 effects an overlap 60 of gold at the pad edges to effectively seal-in the Cr borders. The device of FIGS. 8 and 9 can be passivated by depositing a silicon nitride layer over the top and making a cut down to the gold at the bonding site. Often it is desired to have a diffusion barrier between Chromium and gold and a thin film layer of Ti:W can be deposited between these layers in the device of FIGS. 8 and 9.

Figure 10:
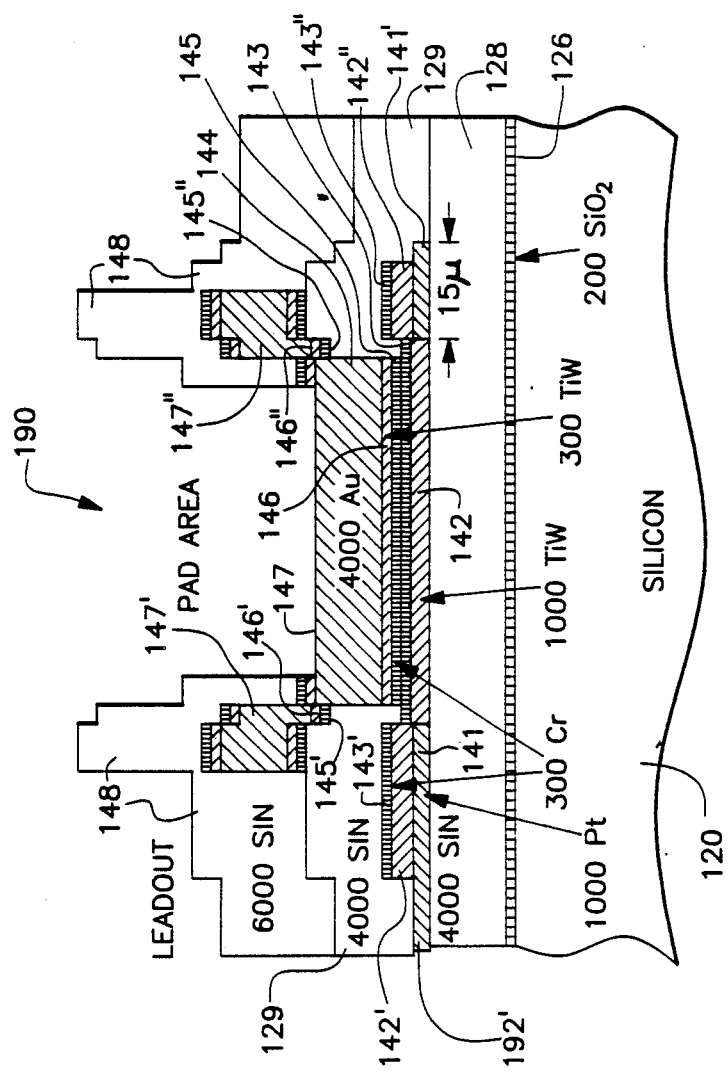

A somewhat different view of the pad stack fabrication is shown in FIG. 10. Many of the comparable identifying numerals have been increased by one hundred over the number used in earlier figures. On the surface of the silicon substrate 120 is deposited a thin film layer (~200 Å) of $SiO_2$ followed by the thin film layer 128 (~4000 Å) of $Si_3N_4$. A thin film of Pt ($\frac{1}{2}$1000 Å) or Ni-Fe 192' on the $Si_3N_4$ forms the leads terminating at 141. In this modification, the termination of the lead is shown in the form of a frame 141' (~15 microns wide) surrounding the bonding site. A thin film (~1000 Å) layer 142, 142', 142" of an adhesion promoting metal such as Ti:W is deposited over the silicon nitride at the bonding site and over the lead termination 141, 141'. Approximately 300 Å of chromium 143, 143', and 143" is deposited over the Ti:W layer Then ~4000 Å of silicon nitride 129 is deposited over the Ti:W and Cr layers. A via 144 is opened through the $Si_3N_4$ layer 129 at he bonding site and another thin film layer 145, 145', 145" of Cr is deposited at the site on the underlying metal 143. A thin film layer 146, 146' 146" (~300 Å) of Ti:W is deposited over the layer 145, 145', 145". A thin film gold layer 147, 147', 147" is then deposited on layer 146. An additional ~6000 Å layer 148 of silicon nitride is deposited to passivate the surface.

The fabrication sequence described above can also be applied when the sensor metal and lead 92' is of nickel-iron (permalloy) instead of platinum and in that case the Cr is replaced with Ti:W.

Thus, there is herein described an improved pad bonding area which eliminates Pt and Ni-Fe from the pad bonding site and provides a pad stack/interconnect metallization sequence comprised only of adhesion promoting metals to provide a stronger more durable and reliable pad stack.

The embodiments of the invention in which an exclusive property or right is claimed are defined as follows:

1. A method for fabricating an improved high adhesion bonding pad area on the silicon nitride surface of a semiconductor microstructure sensor in which the sensing metal per se does not make a strong adhesion bond to the silicon nitride, the steps comprising:
   providing a semiconductor microstructure having a silicon nitride surface portion;
   designating on said silicon nitride surface a bonding pad area;
   depositing a sensor metal on said silicon nitride surface away from said bonding pad area, said sensor metal having a termination in the edge of said bonding pad area;
   annealing said deposited sensor metal;
   locating a bonding site within said bonding pad area so as to be spaced from said sensor metal;
   depositing a thin film layer of an adhesion promoting metal selected from the group consisting of Cr and Ti:W on the $Si_3N_4$ at said bonding site and onto the sensor metal termination;
   depositing a thin film layer of dielectric over said sensor metal, said adhesion promoting metal and bonding pad area;
   opening a via through said dielectric at said bonding site to expose the underlying adhesion promoting metal at the site;
   depositing another thin film layer of the adhesion promoting metal into said via on said site; and
   depositing a thin film layer of gold into said via and onto the adhesion promoting metal.

2. The method according to claim 1 in which the sensor metal is platinum.

3. The method according to claim 1 in which the sensor metal is Ni-Fe alloy.

4. The method according to claim 1 in which the adhesion promoting metal is chromium.

5. The method according to claim 1 in which the adhesion promoting metal is titanium-tungsten alloy.

6. The method according to claim 4 and further comprising the steps of depositing a thin film layer of Ti:W between the $Si_3N_4$ and the layer of chromium.

7. The method according to claim 4 and further comprising the steps of depositing a thin film layer of Ti:W between the Cr and the gold as a diffusion barrier.

8. A high adhesion bonding pad fabricated on the silicon nitride surface of a semiconductor microbridge sensor in which the sensing metal per se, does not make a strong adhesion bond to the silicon nitride comprising:
   a thin film of silicon nitride on the surface of a semiconductor substrate, said $Si_3N_4$ having a smooth surface;
   a bonding pad area on said silicon nitride;
   a sensor metal deposited to said $Si_3N_4$ surface away from said bonding pad area, said sensor metal having a termination in the edge of said bonding pad area, said sensor metal having been annealed to stabilize the sensor;
   a bonding site within said bonding pad area spaced laterally from said sensor metal;
   a thin film layer of an adhesion promoting metal selected from the group consisting of Cr and Ti:W deposited on the $Si_3N_4$ at the bonding site and also onto said sensor metal termination;
   a thin film layer of dielectric material deposited over said sensor metal, said adhesion promoting metal and said bonding pad area;
   a via extending through said dielectric film at said bonding site exposing the underlying adhesion promoting metal at the site;
   another thin film layer of the adhesion promoting metal deposited into said via on said site; and
   a thin film layer of gold deposited into said via on said adhesion promoting metal.

9. The high adhesion bonding pad according to claim 8 in which the sensor metal is platinum.

10. The high adhesion bonding pad according to claim 8 in which the sensor metal is Ni-Fe alloy.

11. The high adhesion bonding pad according to claim 8 in which the adhesion promoting metal is chromium.

12. The high adhesion bonding pad according to claim 8 in which the adhesion promoting metal is titanium-tungsten alloy.

13. The high adhesion bonding pad according to claim 11 and further comprising a thin film layer of Ti:W between the $Si_3N_4$ and the layer of chromium.

14. The high adhesion bonding pad according to claim 11 and further comprising a thin film layer of Ti:W between the Cr and the gold as a diffusion barrier.

* * * * *